UNITED STATES PATENT OFFICE.

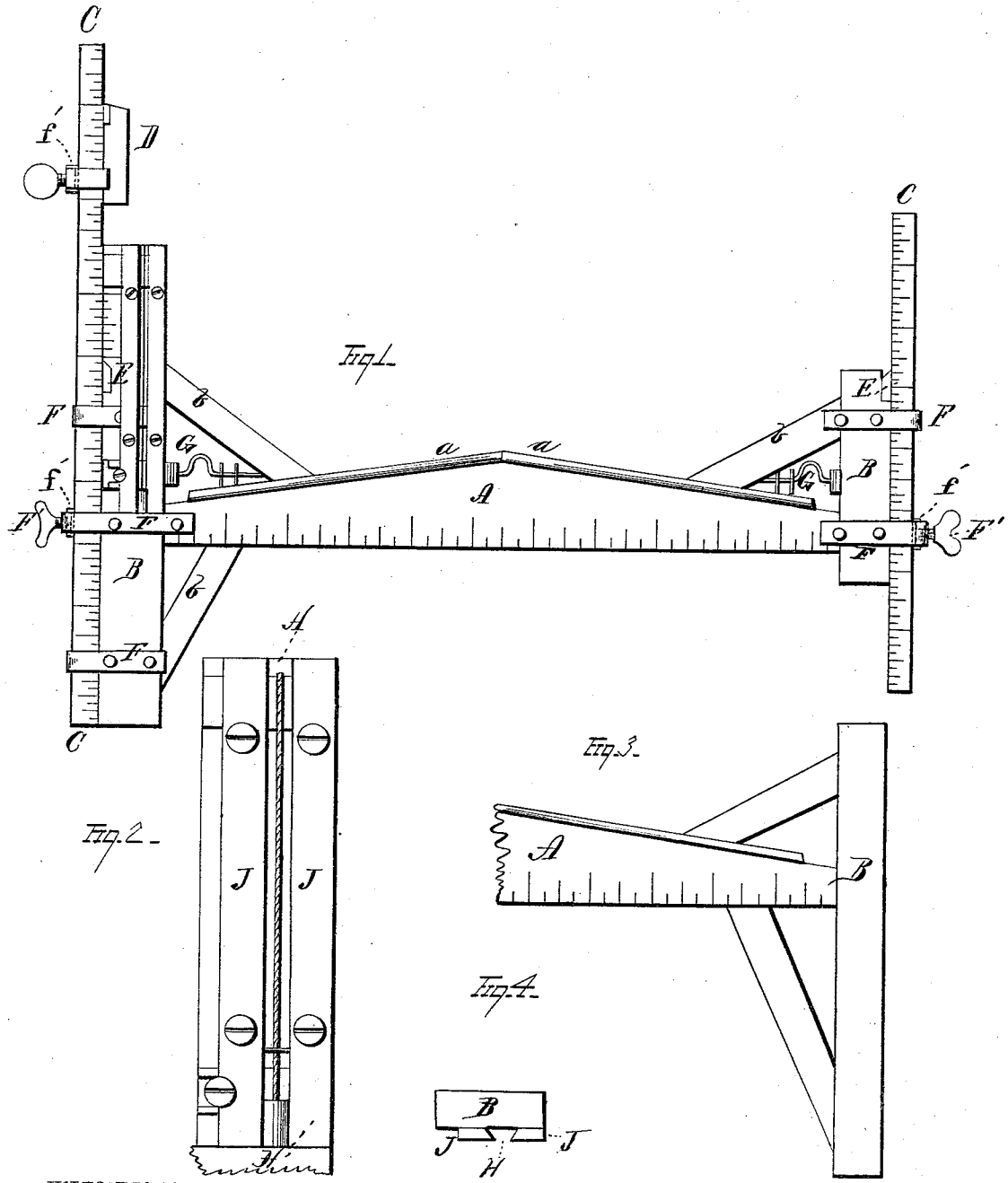

BENJAMIN F. SITTON, OF DAHLONEGA, GEORGIA.

IMPROVEMENT IN GRADING AND LEVELING INSTRUMENTS.

Specification forming part of Letters Patent No. 148,628, dated March 17, 1874; application filed October 18, 1873.

*To all whom it may concern:*

Be it known that I, BENJAMIN F. SITTON, of Dahlonega, in the county of Lumpkin and State of Georgia, have invented certain new and useful Improvements in Instruments for Grading, Leveling, &c.; and I do hereby declare the following to be a full, clear, and exact description of the invention, such as will enable others skilled in the art to which it pertains to make and use it, reference being had to the accompanying drawings, which form part of this specification.

My invention relates to a combined device for measuring and leveling, for use by surveyors.

In the drawings, Figure 1 is a view in elevation of my improvement. Fig. 2 is a side view of the plumb-line and its casing. Fig. 3 is an end view of a variation of my invention. Fig. 4 is a section view of the inclosure of the plumb-line.

My invention relates to the combination of appliances and devices as hereinafter specified and claimed, in which—

A is a bar of suitable length, and divided up with a scale by which to measure fractions of the bar. This bar is strengthened along its middle portion by being made broader here than at its ends, and is stiffened on top by strips $a$. At each end of the bar A are standards B, secured to it at right angles, and these standards are suitably braced by bars $b$. Attached to each of the standards B is a sliding vertical rod, C, and each or either rod is provided with a sliding vane, D, and sights E are attached at equal distances from the lower line of the rod A to the standards B. The sliding rods C slide within collars or straps F, to one of which, at each end of the bar A, is attached a thumb-screw, F'. Out-counters or tallies G, strung upon wires, serve to keep a count of the measurements. The sliding rod C may be dispensed with at one end of the bar A, and, instead thereof, simply a frame, like that shown in Fig. 3, substituted. Upon one of the standards B, which is made rather high for this purpose, is hung a plumb-line, H, bearing the plumb H'. This is protected from exposure by two strips, J, so shaped that they form a dovetailed mortise, like that shown in Fig. 4.

The operation of this device may be briefly explained as follows, sufficiently clear that any person skilled in the art may understand its use.

In leveling, the device is placed at any point erect upon the ground, one standard fixed at a given division, as, for instance, the zero-point of its vertical rod, C, and here clamped. The clamp-screw F', at the other end of the rod A, is then loosened, and its rod C is raised or lowered until the plumb-line is vertical and corresponds with a vertical line cut upon the standard B behind it. The bar A is then level. The reading on the latter bar C is then taken, and the difference between the reading on the two bars C C' indicates the difference of level between the two points measured by one length of the bar A. The instrument is then moved forward one length, and the operation repeated, and so on. Each time that the instrument is moved one length, one of the tally-cards, G, is slipped over the curve in the wire-holder. When the bar A is at a level, any point on the same level can be ascertained by directing the eye across the top of the two sights E E.

The same instrument may be used to measure altitudes, by directing the eye over one of the sights $a$, and carrying the sliding vane D up until the object, the top of the vane D, and the top of the sight E are all in the same line of vision. This angle is noted, as well as its supplement. A horizontal distance in the same vertical plane is then measured off to some distant point, and a similar observation is made. The angle that the line of vision makes with the horizon is here again noted. Either line of sight or distance to the top of the object may then be measured, since we know two angles and the distance between two stations. Knowing one of these distances and all of the angles, the altitude can be reckoned, or the angles may be plotted on a horizontal level, and distance measured.

Its uses are so various and so obvious that one skilled in the art will readily understand where and how to apply it.

Instead of using the plumb-line, the same effect can be produced by two levels placed on the bar A at right angles to each other, and verniers may be used to subdivide the divisions on the rods C, in the usual manner.

What I claim is—

The grading and leveling instrument herein described, consisting of the level-bar A $a$, standards B, adjustable rods C, vane D, sights E, straps F, thumb-screws F' $f'$, suitable leveling device, and with or without the out-counters G, all constructed, arranged, and operating substantially as described.

In testimony that I claim the foregoing I have hereunto set my hand and seal this 8th day of October, 1873.

BENJAMIN F. SITTON. [L. S.]

Witnesses:
  A. G. WIMPY,
  G. HUGHES.